(12) United States Patent
Guo et al.

(10) Patent No.: US 6,675,823 B2
(45) Date of Patent: Jan. 13, 2004

(54) RELIEF VALVE

(75) Inventors: Maoying Guo, Tokyo (JP); Hideki Tsuchiya, Tokyo (JP); Kiyokazu Nagata, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/441,068

(22) Filed: May 20, 2003

(65) Prior Publication Data

US 2003/0196697 A1 Oct. 23, 2003

Related U.S. Application Data

(62) Division of application No. 09/930,242, filed on Aug. 16, 2001, now abandoned.

(30) Foreign Application Priority Data

Sep. 11, 2000 (JP) .......................................... 2000-275215

(51) Int. Cl.⁷ .......................... F16K 15/04; F16K 47/00
(52) U.S. Cl. ............................. 137/115.04; 137/514.5; 137/539.5
(58) Field of Search ......................... 137/115.04, 115.05, 137/115.06, 539.5, 514.5, 514.7

(56) References Cited

U.S. PATENT DOCUMENTS

| | | | | |
|---|---|---|---|---|
| 1,104,201 A | * | 7/1914 | Lenzi ............................ 215/19 |
| 3,003,423 A | * | 10/1961 | Drutchas .................. 137/539.5 |
| 3,217,732 A | * | 11/1965 | Haugeland ............. 137/115.08 |
| 5,183,075 A | * | 2/1993 | Stein ........................ 137/493.6 |
| 5,251,664 A | * | 10/1993 | Arvidsson et al. ........ 137/539.5 |
| 5,595,213 A | * | 1/1997 | Brown ..................... 137/515.5 |
| 5,685,332 A | * | 11/1997 | Overdiek et al. ...... 137/115.04 |
| 5,775,360 A | * | 7/1998 | Hayashi et al. ......... 137/115.05 |

FOREIGN PATENT DOCUMENTS

JP 08-42513 2/1996

* cited by examiner

*Primary Examiner*—Stephen M. Hepperle
(74) *Attorney, Agent, or Firm*—Rabin & Berdo, P.C.

(57) ABSTRACT

A gap 11 between a flange 4A of a bail support member 4 and the inner circumferential surface of a sleeve member 7 functions as an orifice for restricting an oil flow downstream of a seat hole (6B). The movement of the ball support member 4 is stabilized, pressure is generated in a chamber 9 downstream of a seat hole 6B, and the override characteristics of the relief valve 1 are improved.

3 Claims, 10 Drawing Sheets

RELIEF VALVE

CROSS REFERENCE TO RELATED APPLICATION

This application is a Divisional Application of applicants' U.S. patent application Ser. No. 09/930,242 filed on Aug. 16, 2001, now abandoned.

FIELD OF THE INVENTION

This invention relates to a relief valve.

BACKGROUND OF THE INVENTION

JP-A-H8-42513 published in 1996 by the Japanese Patent Office discloses a relief valve included in the flow control valve of a power steering device.

FIG. 10 shows this flow control valve 200. A relief valve 250 is incorporated in a spool 201 of the flow control valve 200, as shown in the diagram.

Oil supplied to a supply chamber 202 at the tip of the spool 201 from the pump port P is supplied to the power steering device via an orifice 203 and an oil supply port 204.

The oil pressure on the side of the oil supply port 204 (oil pressure downstream of the orifice 203) is introduced to a flowrate control spring chamber 205 at the base end of the spool 201. The spool 201 displaces under a balance between a thrust force due to the oil pressure of the supply chamber 202 and the supply port 204 (oil pressure both upstream and downstream of the orifice 203), and a reaction due to the spring force of a spring 206 provided in the flow rate control spring chamber 205 and the oil pressure of the flowrate control spring chamber 205. When the differential pressure upstream and downstream of the orifice 203 increases due to an increase of the pump rotation speed, the thrust force due to the oil pressure of the supply chamber 202 exceeds the reaction force, the spool 201 displaces in the base direction (left-hand direction of FIG. 10), and the supply chamber 202 communicates with a tank port T. Therefore, part of the flowrate from the pump port P is returned to the tank, and the flowrate is controlled.

When the load on the power steering device increases and the oil pressure of the oil supply port 204 sharply increases, if the oil pressure of the pressure control spring chamber 205 exceeds the set pressure of the relief valve 250, the relief valve 250 is pushed open, and oil in the pressure control spring chamber 205 escapes to the tank port T. As a result, the spool 201 displaces in the base end direction, oil pressure in the supply chamber 202 escapes to the tank port T, and the supply pressure is prevented from increasing beyond the permitted pressure.

SUMMARY OF THE INVENTION

However, in the aforesaid relief valve 250, there is a large gap between a ball support member 252 which supports a ball 251, and the inner circumference of a valve hole 253, so movable members (the ball 251 and ball support member 252) easily vibrate in a side direction (radial direction) due to the effect of the inclination of a return spring 254 and the side force of the flow when the relief valve 250 opens.

Further, in this relief valve 250, in a transient state when the movable members are pushed open, noise is produced by chattering which makes the operation of the movable members unstable. If the diameter of a seat orifice 255 is reduced, this chattering can be suppressed, but in this case pressure losses increase, and override characteristics of the relief valve 250 (characteristics of the difference between a set pressure and a cracking pressure) are impaired.

It is therefore an object of this invention to stabilize the operation of movable members, prevent chattering and improve override characteristics in a relief valve.

In order to achieve the above object, this invention provides a relief valve, comprising a valve seat comprising a seat hole, a ball which opens and closes the seat hole from the downstream side, a movable member which supports the ball from the downstream side, a housing part which houses the movable member, and an orifice formed downstream of the seat hole which damps the vibration of the movable member and suppresses chattering by restricting an oil flow.

According to an aspect of this invention, this invention provides a flowrate control valve which controls the flowrate supplied from a pump to a load circuit comprising a relief valve, the relief valve comprising a valve seat having a seat hole, a ball which opens and closes the seat hole from the downstream side, a movable member which supports the ball from the downstream side, a housing part which houses the movable member, and an orifice formed downstream of the seat hole which damps the vibration of the movable member 4 and suppresses chattering by restricting an oil flow. The relief valve opens when the pressure on the load circuit side rises, and part of the fluid from the pump is discharged to a tank port.

The details as well as other features and advantages of this invention are set forth in the remainder of the specification and are shown in the accompanying drawings.

DESCRIPTION OF THE PREFERRED EMBODIMENTS

DESCRIPTION OF THE PREFERRED EMBODIMENTS

In the following embodiments, the relief valve of this invention is incorporated in a flowrate control valve which controls the oil flowrate to a power steering device from a vane pump.

Figure 1:
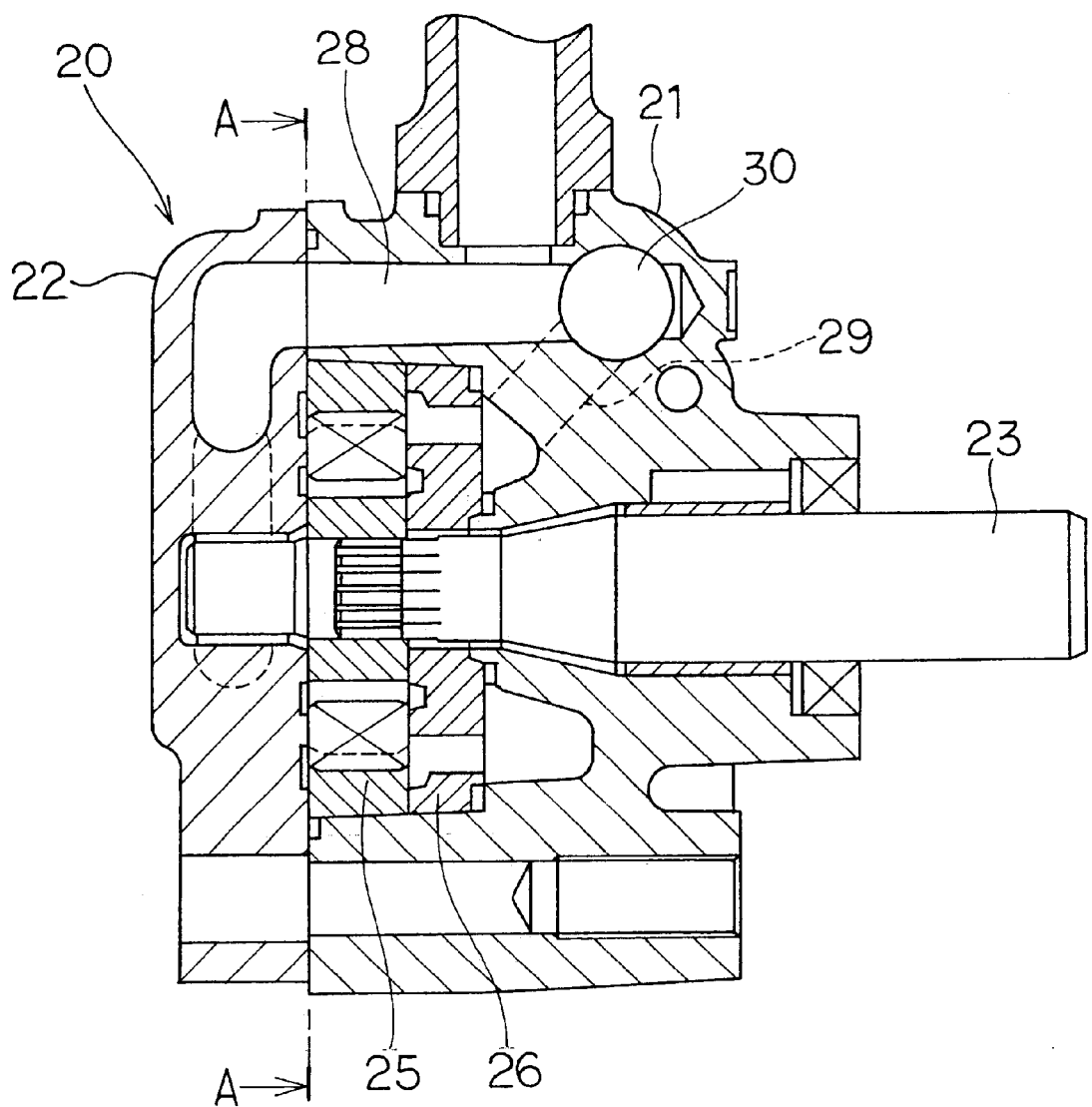
FIG. 1 is a cross-sectional diagram of a vane pump in which the relief valve of this invention is applied.
Figure 2:
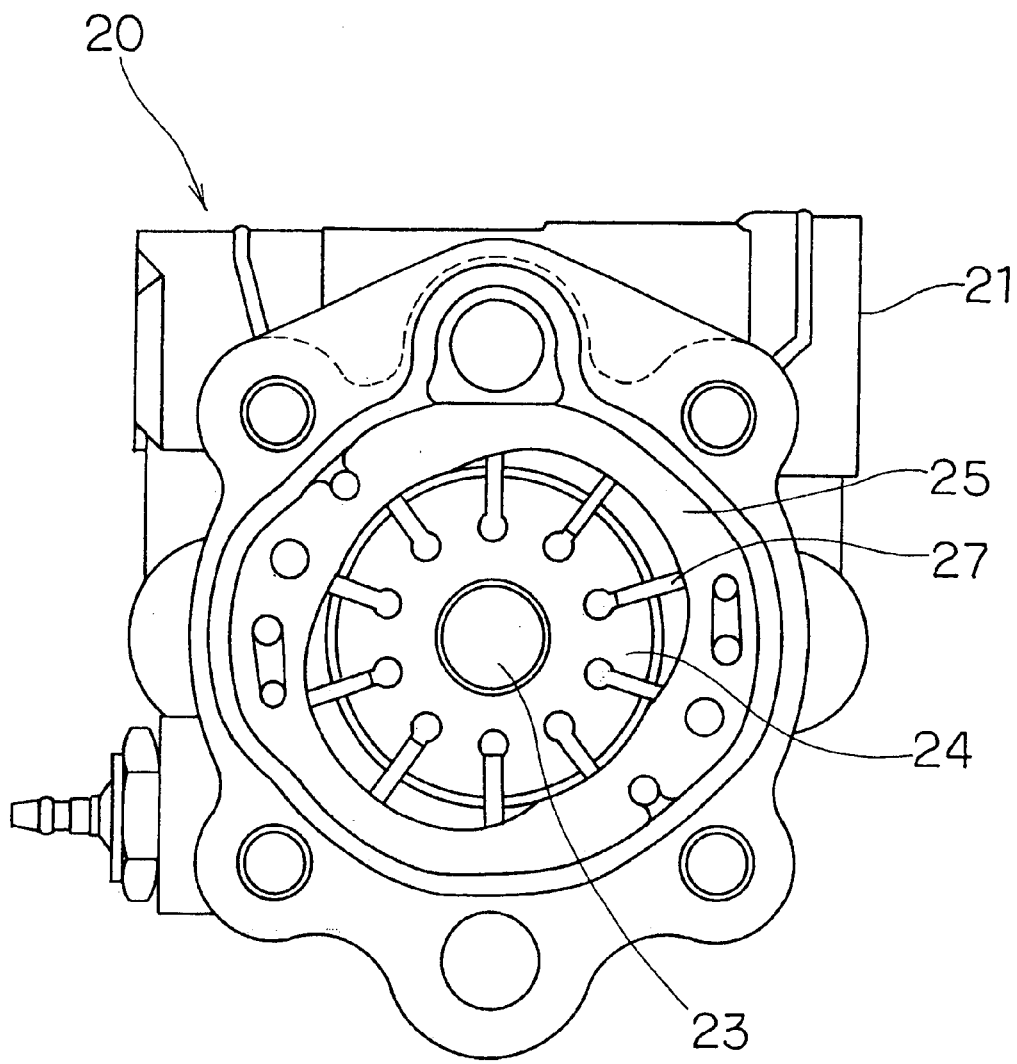
FIG. 2 is a cross-sectional view through a line A—A in FIG. 1.

FIG. 1, FIG. 2 show the construction of a vane pump 20. The construction of the vane pump is common to each embodiment.

The vane pump 20 comprises a body 21, cover 22, shaft 23, rotor 24, cam ring 25 and side plate 26.

The shaft 23 is a drive shaft of the rotor 24 installed in the body 21, and is supported free to rotate in the body 21. The shaft 23 is connected to the engine of a vehicle, not shown, and rotates together with the rotation of the engine.

The rotor 24 is disposed on the inside of the cam ring 25 which has an elliptical inner wall. The rotor 24 is gripped between the cover 22 and the side plate 26.

Plural vanes 27 are arranged radially on the outer circumference of the rotor 25. The vanes 27 can move into or out of the rotor 24. When the rotor 24 rotates, the vanes 27 protrude until their ends come in contact with the inner circumferential surface of the cam ring 25. Due to this, a pump chamber is formed between each of the vanes 27, this chamber expanding and contracting together with the rotation of the rotor 24.

In the expansion stroke, these pump chambers draw in oil from a low pressure passage 28 which communicates with a tank, not shown. On the other hand, in the contraction stroke, oil is discharged into a high-pressure passage 29. The high-pressure passage 29 communicates with the power steering device, not shown, via a flowrate control valve 30 described later.

Figure 3:
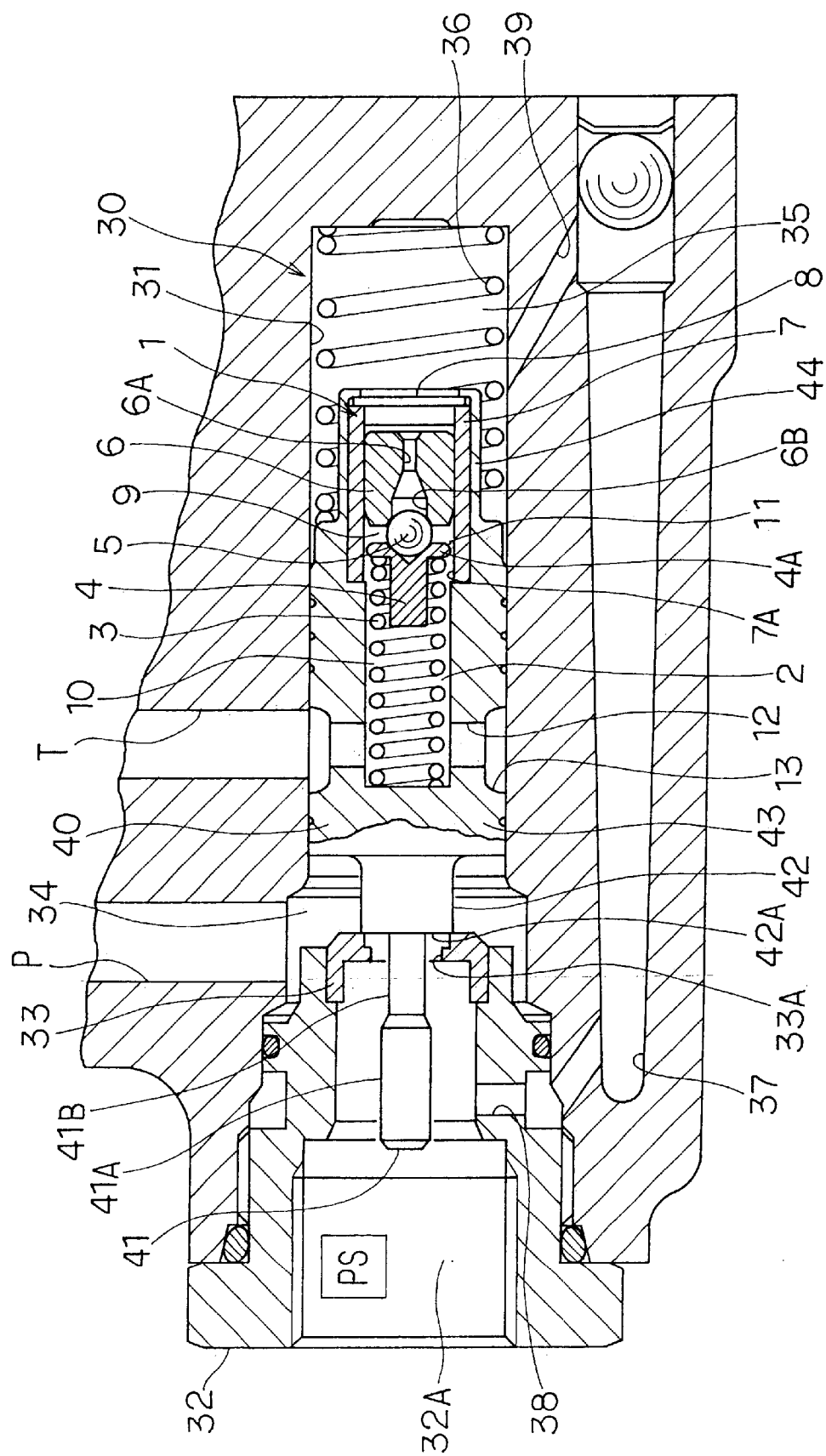
FIG. 3 is a cross-sectional view of a flowrate control valve and relief valve.

FIG. 3 shows the construction of the flowrate control valve 30 according to the first embodiment of this invention, and a relief valve 1 built into the flowrate control valve 30.

When the engine rotates at low speed, oil supplied to the power steering device must increase together with increase of the engine rotation speed. On the other hand, when the engine rotates at high speed, the amount of oil supplied to the power steering device must be limited so that it does not increase even if the engine rotation speed rises. The flowrate control valve 30 is provided for this flowrate control, and when the engine rotation speed (rotation speed of the vane pump 20) increases, it drains the oil which exceeds the required oil supply amount.

The flowrate control valve 30 comprises a spool 40 housed free to slide in a slide hole 31 formed in the body 21 of the vane pump 20. A connector 32 is screwed into the open end of the slide hole 31. The hollow part of the connector 32 is an oil supply port 32A for supplying oil to the power steering device, not shown.

A plug 33 is fitted to the base of the connector 32. A hole is formed in the plug 33. A shaft member 41 of the spool 40 passes through this hole, and a gap between the outer circumference of the shaft member 41 and the inner circumference of the hole forms an orifice 33A.

A large diameter part 41A and a small diameter part 41B having a smaller diameter than the large diameter part 41A, are formed in order from the end at the shaft member 41 of the spool 40. Consequently, the opening area of the orifice 33A varies according to whether the large diameter part 41A or the small diameter part 41B is inside the hole.

In this embodiment, the opening area of the orifice 33A can be varied by the shaft member 41 of the spool 40 in this way, but the member which varies the opening area of this orifice 33A may be separated from the flowrate control valve 30, and the member which varies the opening area of the orifice 33A may be driven by a solenoid. In this way, the opening area of the orifice 33A can be controlled more precisely.

The oil supply port 32A (downstream of the orifice 33A) communicates with a flowrate control spring chamber 35 via a communicating passage 37. An orifice 38 is provided between the communicating passage 37 and the oil supply port 32A, and an orifice 39 is provided between the communicating passage 37 and flowrate control spring chamber 35.

A contact step part 42 is formed at the base end of the shaft member 41 of the spool 40. The diameter of the contact step part 42 is larger than the diameter of the opening of the plug 33. Hence, when the spool 40 displaces towards the tip end (left-hand side of the figure), and an end face 42A of the contact step part 42 comes in contact with the plug 33, the orifice 33A is closed by the contact step part 42.

A sliding part (land part) 43 is formed at the base end of the contact step part 42 of the spool 40. The sliding part 43 slides along the inner circumferential surface of the slide hole 31. The inside of the slide hole 31 is divided into a supply chamber 34 (upstream of the orifice 33A) at the tip end of the spool 40 (left-hand side of the figure), and the flowrate control spring chamber 35 at the base end of the spool 40 (the right-hand side of the figure), by this sliding part 43.

The base end from the sliding part 43 of the spool 40 is a base end part 44 of smaller diameter than the sliding part 43. A flowrate control spring 36 is disposed on the outer circumference of this base end part 44. The base end of the flowrate control spring 36 comes in contact with the base of the slide hole 31, and the flowrate control spring 36 pushes the spool 40 in the direction of the tip end (left-hand side of the figure).

A pressure port P which communicates with the high-pressure passage 29 of the vane pump 20 and a tank port T which communicates with a tank, open onto the side face of the slide hole 31. The pump port P is situated near the open end of the slide hole 31, and communicates with the supply chamber 34. The tank port T is situated on the far inside (right-hand side of the figure) of the slide hole from the pump port P, and communication and non-communication with the supply chamber 34, and the communicating area when they do communicate, may be changed over by the displacement of the spool 40.

The relief valve 1 is built into the spool 40 from the side of the flowrate control spring chamber 35. The relief valve 1 is used a s a pilot valve when pressure control is performed in the flowrate control valve 30. Specifically, when a large load acts on the power steering device and the pressure of the oil supply port 32A sharply increases, the flowrate control valve 30 also functions as a pressure control valve which decreases the supply pressure from the vane pump 20. In this pressure control, the relief valve 1 is a valve which is built into the spool 40 of the flowrate control valve 30 functions as a valve which controls the flowrate control valve 30 when the pressure of the oil supply port 32A increases.

The relief valve comprises a return spring 3, ball support member 4, ball 5, valve seat 6 and sleeve member 7 built into the valve hole 2 which opens onto the base end of the spool 40.

The sleeve member 7 is fixed to the inner circumferential surface at the open end of the valve hole 2. The valve seat 6 is fixed to an inner circumferential surface 7A of the sleeve member 7. A seat orifice 6A is formed coaxially with the valve seat 6, and a downstream end part of this seat orifice 6A forms a seat hole 6B. A filter 8 is attached to the open end (upstream of the seat orifice 6A) of the valve hole 2.

The ball 5 and ball support member 4 are disposed downstream of the valve seat 6 (left-hand side of FIG. 3). A return spring 3 is provided on the outer circumference of the ball support member 4. The return spring 3, disposed between a flange 4A of the ball support member 4 and the base surface of the valve hole 2, pushes the ball support member 4 in the direction of the valve seat 6.

The ball 5 is supported by the ball support member 4, and is pushed against the seat hole 6B of the valve seat 6 by the spring force of the return spring 3 so as to seal the seat hole 6B. When a fluid pressure in the flowrate control spring chamber 35 of the flowrate control valve 30 exceeds the spring pressure of the return spring 3, the ball 5 is pushed open, and oil is introduced into the valve hole 2 from the seat orifice 6A and seat hole 6B.

The flange 4A is formed at the base end of the ball support member 4. The flange 4A divides the inside of the valve hole 2 into a chamber 9 and a pressure control spring chamber 10.

A gap 11 is formed as an orifice between the flange 4A and the inner circumferential surface 7A of the sleeve member 7 which extends to the side of the flange 4A. The gap 11 is a gap which is sufficiently narrow to have a sufficient damping effect on the movement of the ball support member 4, and its width in the radial direction is preferably set to below $1/20$ of the inner diameter of the sleeve member 7.

Due to this gap 11, in the relief valve 1, the movement of the ball support member 4 and ball 5 can be stabilized without decreasing the override characteristics, and the noise due to chattering can be suppressed. The fact that sufficient damping effect is obtained when the width (width in the radial direction) of the gap 11 is set to less than $1/20$ of the inner diameter of the sleeve member 7, is confirmed by experiment and analysis.

The pressure control spring chamber 10 communicates with the tank port T via plural oil passages 12 and an outer circumferential groove 13. The outer circumferential groove 13 is an annular groove formed on the outer circumference of a slide part 43 of the spool 40.

Next, the operation of this device will be described.

When the engine, not shown, is started, the vane pump 20 rotates according to the engine rotation, and oil is supplied to the supply chamber 34 of the flowrate control valve 30 from the pump port P. This oil flows into the oil supply port 32A via the orifice 33A, and is supplied to the power steering device. When the oil supply amount supplied to the power steering device is small at low pump rotation speeds, the oil supply amount increases in direct proportion to the pump rotation speed.

In this case, the differential pressure between the supply chamber 34 (upstream of the orifice 33A) and the oil supply port 32A (downstream of the orifice 33A) is determined by the opening area of the orifice 33A and the flowrate passing through the orifice 33A, and it increases as the rotation speed of the vane pump 20 rises and the flowrate flowing through the orifice 33A increases.

Oil is led to the pressure control spring chamber 35 of the flowrate control valve 30 via the orifice 38, oil passage 37 and orifice 39. When the rotation speed of the vane pump 20 increases and the differential pressure upstream and downstream of the orifice 33A increases, the spool 40 displaces in the base end direction (right-hand side of the figure) against the flowrate control spring 36. Specifically, when the flowrate passing through the orifice 33A increases, a thrust force (product of a pressure P1 of the supply chamber 34 and pressure receiving area A1 on the side of the supply chamber 34 of the spool 40 and the axial force due to the pressure in the oil supply port 32A) which presses the spool 40 in the base end direction, exceeds the reaction (sum of the spring force F of the flowrate control spring 36, and product of the pressure P2 of the flowrate and control spring chamber 35 and pressure receiving area A2 on the side of the flowrate control spring chamber 35 of the spool 40) which presses the spool 40 back towards the tip end (left-hand side of the figure), the spool 40 retreats in the base end direction.

Due to the retreat of the spool 40, the supply chamber 34 communicates with the tank port T. Hence, part of the oil supplied from the pump port P is discharged to the tank port T, and increase of the oil supply amount supplied to the power steering device is suppressed even if the pump rotation speed rises. Further, when the large diameter part 41A of the spool 40 moves inside the orifice 33A, the opening area of the orifice 33A becomes narrow, and the oil supply amount supplied to the power steering device is further suppressed. In this way, the oil supply amount to the power steering device is controlled according to the pump rotation speed.

Also, the pressure of the supply chamber 34 is controlled as follows. For example, when the pressure of the oil supply port 32A increases sharply due to a kickback or the like from the power steering device, this pressure is transmitted to the flowrate control spring chamber 35 via the orifice 38, oil passage 37 and orifice 39. Hence, the pressure of the flowrate control spring chamber 35 increases, and when it exceeds the set pressure of the relief valve 1, the relief valve 1 is pushed open, and the flowrate control spring chamber 35 and tank port T are made to communicate. Specifically, the ball 5 and ball support member 4 are pushed open against the spring force of the return spring 3, and oil in the flowrate control spring chamber 35 is discharged to the tank port T via the filter 8, the seat orifice 6A, the seat hole 6B, a chamber 9, the gap 11 which functions as an orifice, a pressure control spring chamber 10, an oil passage 12 and the outer circumferential groove 13. As a result, the pressure of the flowrate control spring chamber 35 decreases, and the spool 40 retreats toward the right of the figure. Hence, the supply pressure of the supply chamber 34 is discharged to the tank port T, and is controlled so that it does not become excessive. Further, the opening area of the orifice 33A is made narrower by the large diameter part 41A, and the flowrate flowing into the power steering device is limited.

The relief valve 1 functions in this way in pressure control, but according to this embodiment, the gap 11 is formed between the flange 4A and the inner circumferential surface 7A of the sleeve member 7. Therefore, due to the resistance (pressure loss) and damping force when oil passes through this gap 11, override is improved, the operation of the ball support member 4 is stabilized, and chattering is suppressed. Specifically, vibration of the ball support member 4 in the side and axial directions is suppressed, and noise accompanying this vibration is prevented.

Also, due to the gap 11, a pressure appears in the chamber 9 (downstream of the seat hole 6B of the relief valve 1) and the pressure increases as the flowrate increases, so the override characteristics of the relief valve 1 (difference between the set pressure and cracking pressure of the relief valve 1) improve.

Figure 4:
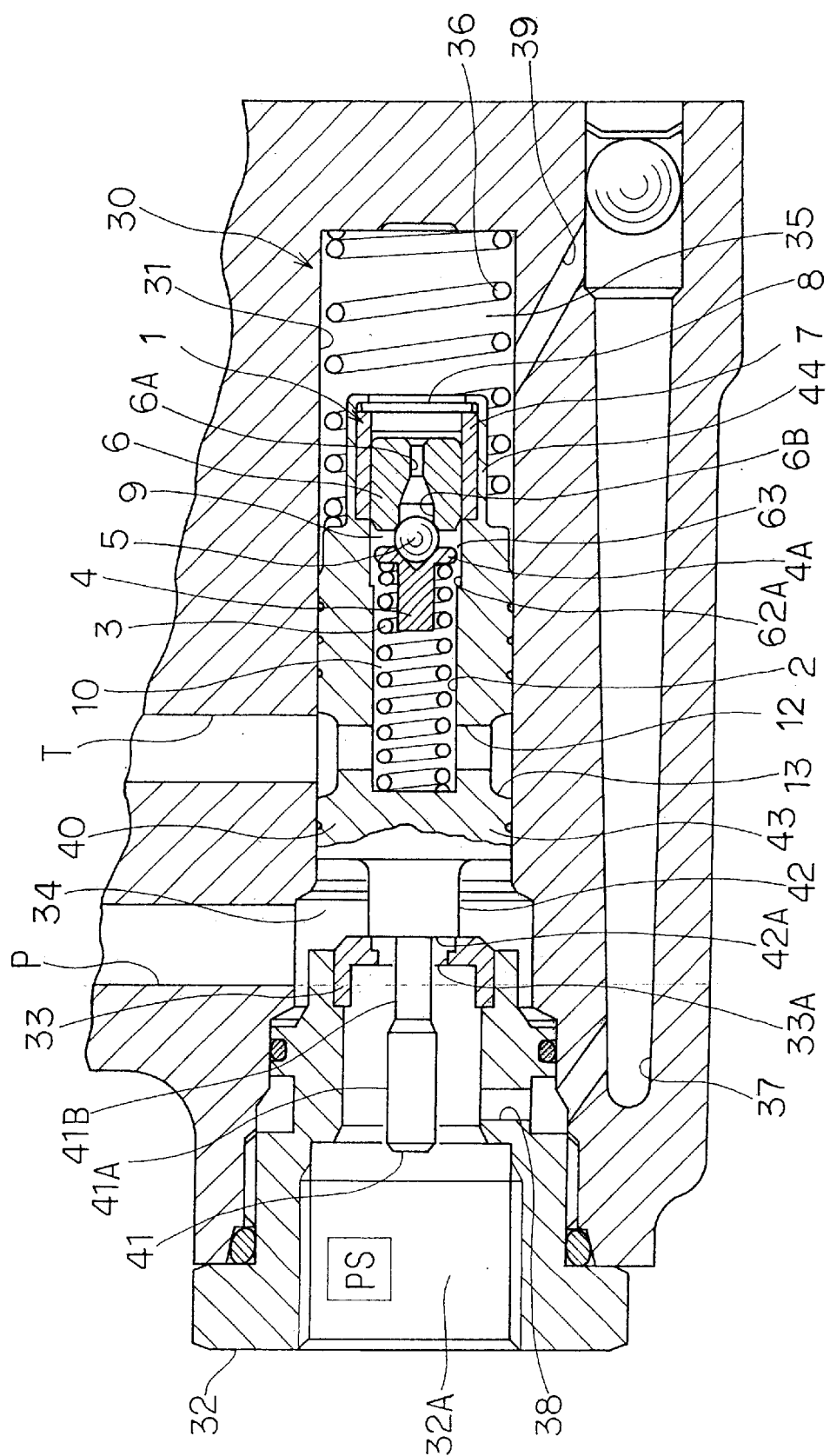
FIG. 4 is similar to FIG. 3, but showing a second embodiment of this invention.

FIG. 4 shows a second embodiment.

The second embodiment is different from the first embodiment in the following points.

The sleeve member 7 of the second embodiment is shorter than that of the first embodiment, and it does not extend to the side of the flange 4A of the ball support member 4. Instead, a guide depression 62A is formed in a valve hole 2 on the side of the flange 4A, and a gap 63 between the flange 4A and guide depression 62A functions as an orifice. The gap 63 is sufficiently narrow to have a sufficient damping effect on the movement (vibration) of the ball support member 4, and the width in the radial direction is preferably set to less than $1/20$ of the inner diameter of the depression 62A.

Therefore, in addition to having an identical effect to that of the first embodiment, according to the second embodiment, there is no need to adjust the relation between the inner diameter of the sleeve member 7 and the outer diameter of the flange 4A forming the gap 63, and freedom of design is enhanced.

It is not absolutely necessary to provide the guide depression 62A in the valve hole 2, and the gap 63 may be formed between the flange4A and the inner circumferential surface of the valve hole 2 which does not have a depression.

Figure 5A:
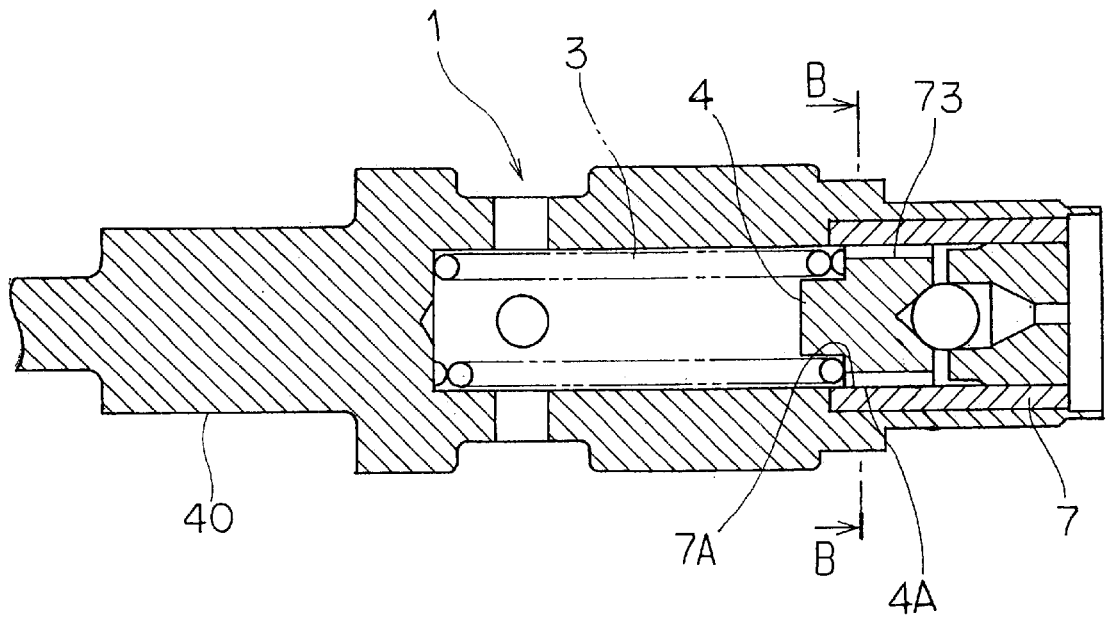
FIG. 5A is a cross-sectional view of a relief valve according to a third embodiment of this invention.
Figure 5B:
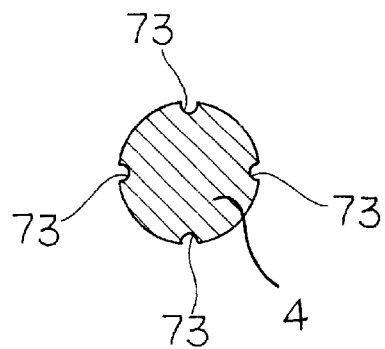
FIG. 5B is a cross-sectional view through a line B—B in FIG. 5A.

FIG. 5A shows the relief valve 1 according to a third embodiment. FIG. 5B shows a cross-sectional view through a line B—B in FIG. 5A.

The third embodiment is different from the first embodiment in the following points. Also in t he third embodiment, the relief valve 1 is built into the spool 40 of the flowrate control valve 30 as in the case of the aforesaid first embodiment.

In the third embodiment, the flange 4A of the ball support member 4 is made wider in the axial direction, and its outer circumferential surfaces slides on the inner circumferential surface 7A of the sleeve member 7. Plural grooves 73 (in this embodiment, four notches provided at 90 degree intervals) are formed extending in the axial direction of the ball support member 4, and these grooves 73 function as orifices. The grooves 73 are set to a width and depth at which sufficient damping effect can be exerted on the movement (vibration) of the ball support member 4.

Due to these grooves 73, in the third embodiment, an identical effect is obtained as in the case of the first embodiment. The flange 4A comes in contact with the inner circumferential surface 7A of the sleeve member 7, so vibration of the ball support member 4 in the side direction is completely prevented. According to this embodiment, the grooves 73 are formed by cutting notches out of the outer circumferential surface of the flange 4A, so they are easily formed, precise machining is easy, and precision of the damping force setting is enhanced. Further, as the grooves 73 are formed on the outer circumferential surface of the flange 4A, they are not sealed off by the edges of the return spring 3. In this embodiment, the grooves 73 are formed in the outer circumference of the flange 4A, but they may be formed in the inner circumference 7A of the sleeve member 7.

Figure 6:
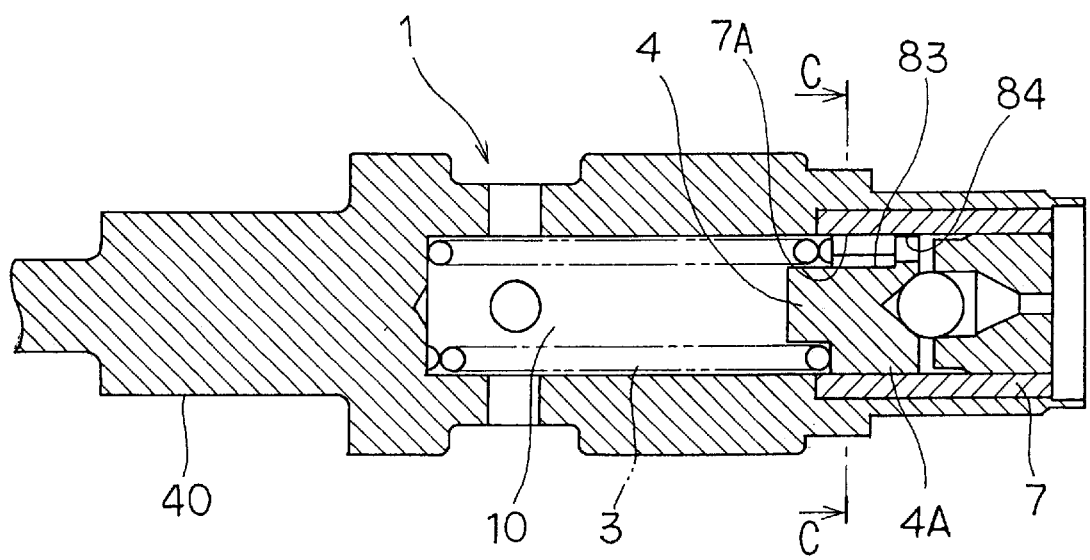
FIG. 6A is a cross-sectional view of a relief valve according to a fourth embodiment of this invention.
FIG. 6B is a cross-sectional view through a line C—C in FIG. 6A.
Figure 6B:
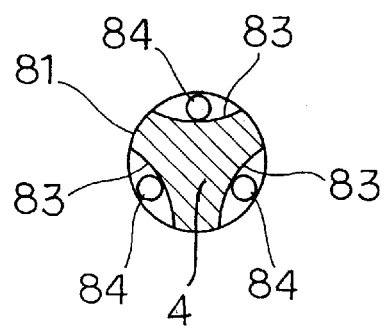

FIG. 6A shows a fourth embodiment. FIG. 6B shows a vertical cross-sectional through a line C—C of FIG. 6A.

The fourth embodiment differs from the first embodiment in the following points. Also in the fourth embodiment, the relief valve 1 is built into the spool 40 of the flowrate control valve 30.

According to the fourth embodiment, the flange 4A of the ball support member 4 is made wider in the axial direction, and its outer circumferential surfaces slides completely on the inner circumferential surface 7A of the sleeve member 7. Plural depressions 83 which open onto the pressure control spring chamber 10 are formed in the outer circumferential surface of the flange 4A. Further, holes 84 which axially pass through the flange 4A are provided in the inner part of the depressions 83. These throughholes 84 function as orifices. The cross-sectional areas of the throughholes 84 are set to a size such that a sufficient damping effect on the movement (vibration) of the ball support member 4 is obtained.

Due to the throughholes 84, an identical effect is obtained in the fourth embodiment as in the first embodiment. Further, the flange 4A comes in contact with the inner circumferential surface 7A of the sleeve member 7, so vibration of the ball support member 4 in the side direction is completely prevented. The orifice is formed as the throughholes 84 which pass through the flange 4A, so it can be easily formed, precise machining is easy, and the precision of the damping force setting is enhanced. Further, the throughholes 84 are formed inside the depression parts 83, so even if the return spring 3 is installed at the end of the flange 4, they are not sealed off by the end of the return spring 3.

Figure 7:
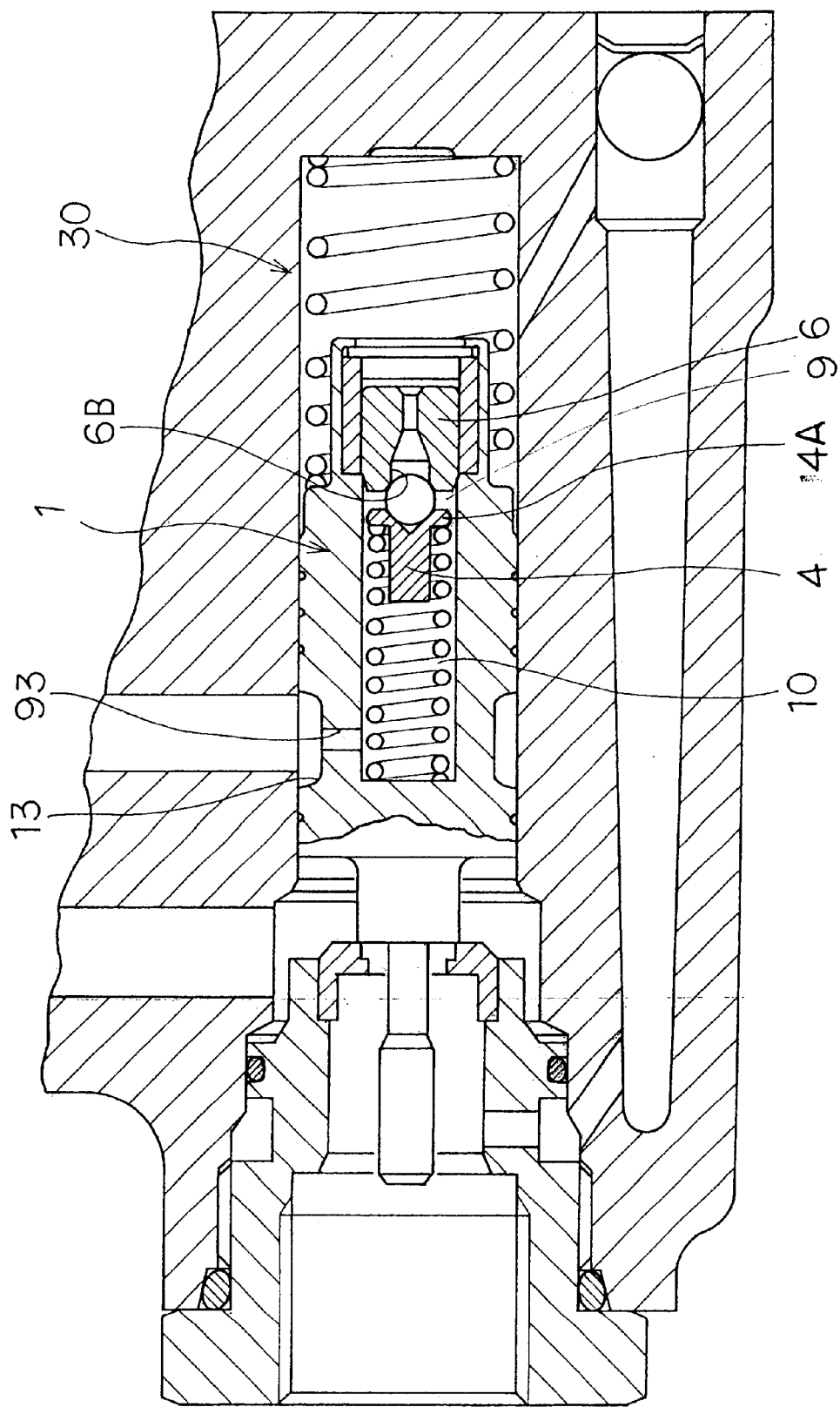
FIG. 7 is similar to FIG. 3, but showing a fifth embodiment of this invention.

FIG. 7 shows a fifth embodiment.

The fifth embodiment differs from the first embodiment in the following points. The remaining features of the construction are identical.

In the fifth embodiment, the pressure control spring chamber 10 and outer circumferential groove 13 communicate not through the oil passage 12 but through an orifice 93.

When the relief valve 1 is pushed open, due to the flow through the orifice 93, a suitable back pressure is set up in the pressure control spring chamber 10, the effect of mixing with air is suppressed, and cavitation in the pressure control spring chamber 10 is prevented. The operation of the ball support member 4 is stabilized, and noise due to chattering is reduced. Further, a pressure appears in the chamber 9 downstream of the seat hole 6B, so override characteristics are improved.

Figure 8:
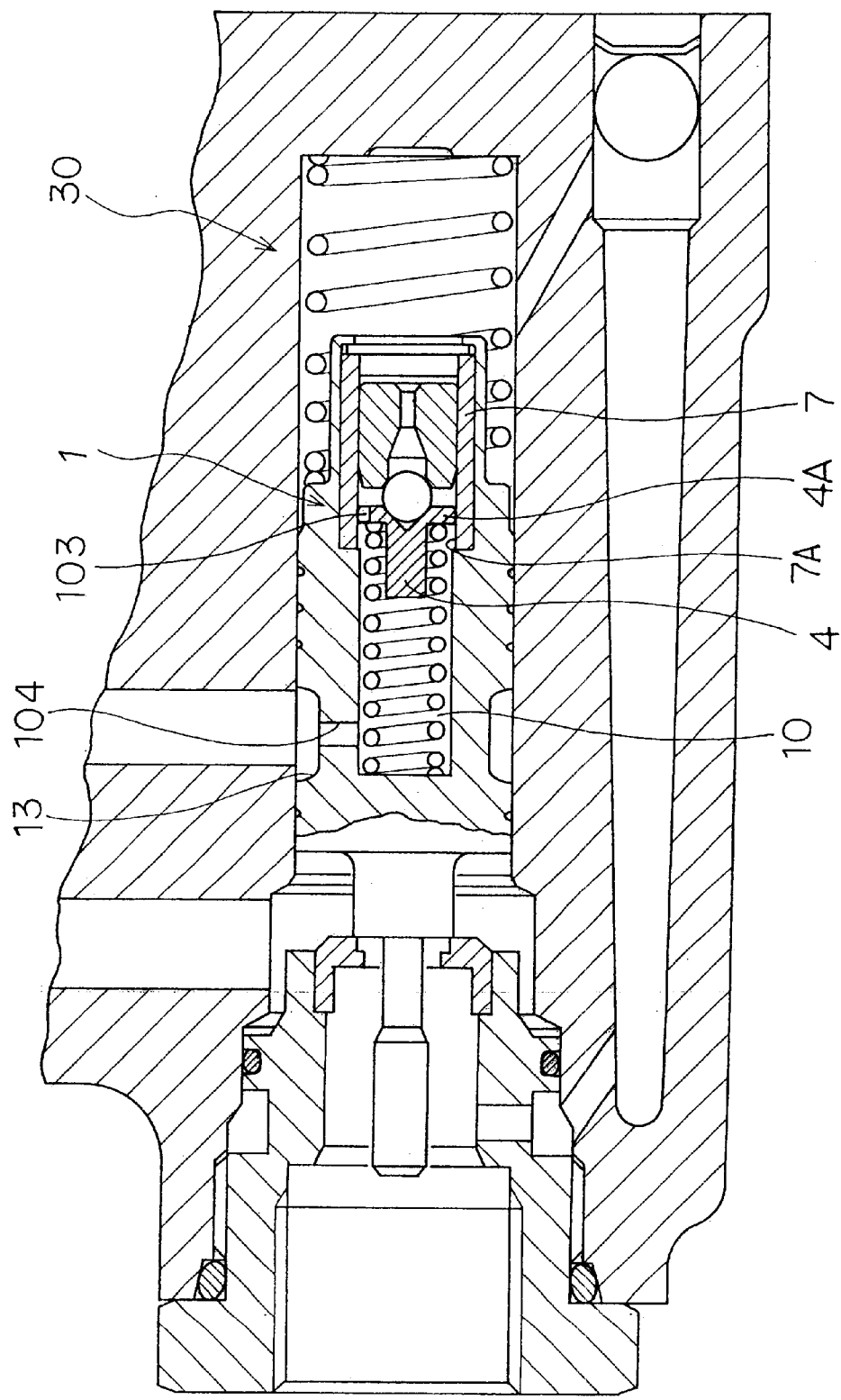
FIG. 8 is similar to FIG. 3, but showing a sixth embodiment of this invention.

FIG. 8 shows a sixth embodiment.

In the sixth embodiment, in the construction of the fifth embodiment (FIG. 7) wherein the pressure control valve chamber 10 and the outer circumferential groove 13 communicate via an orifice, a notch-shaped orifice 103 is formed on the outer circumference of the flange 4A.

Specifically, in the sixth embodiment, the flange 4A of the ball support member 4 slides on the inner circumferential surface 7A of the sleeve member 7, and the notch-shaped orifice 103 is formed on the outer circumference of the flange 4A. The cross-sectional area of the orifice 103 is set to a size such that a sufficient damping effect is given to the movement (vibration) of the ball support member 4.

The pressure control valve chamber 10 and outer circumferential groove 13 communicate via an orifice 104. Due to this construction, vibration of the ball support member 4 in the side direction is more definitely prevented.

Figure 9:
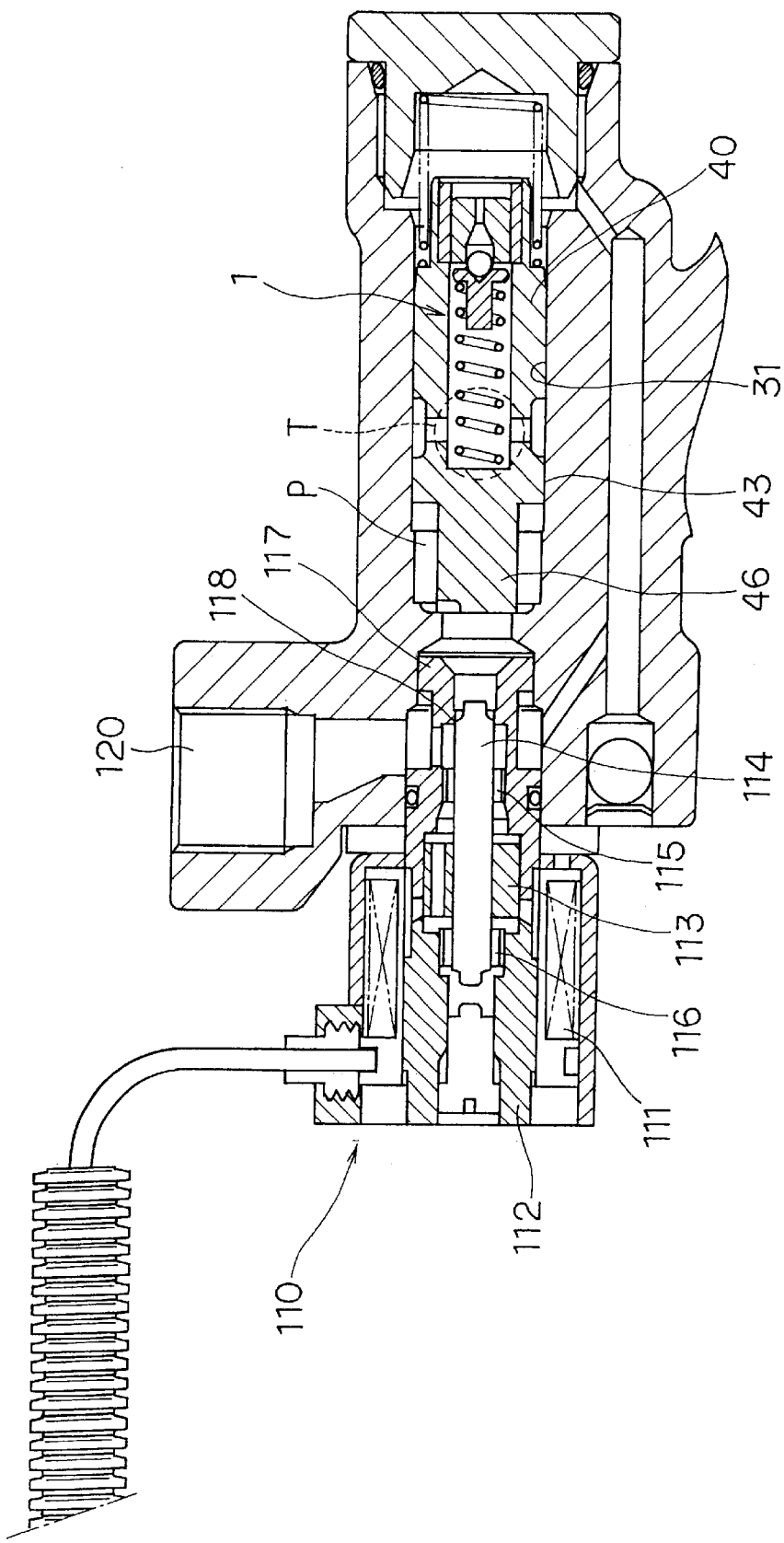
FIG. 9 is similar to FIG. 3, but showing a seventh embodiment of this invention.
Figure 10:
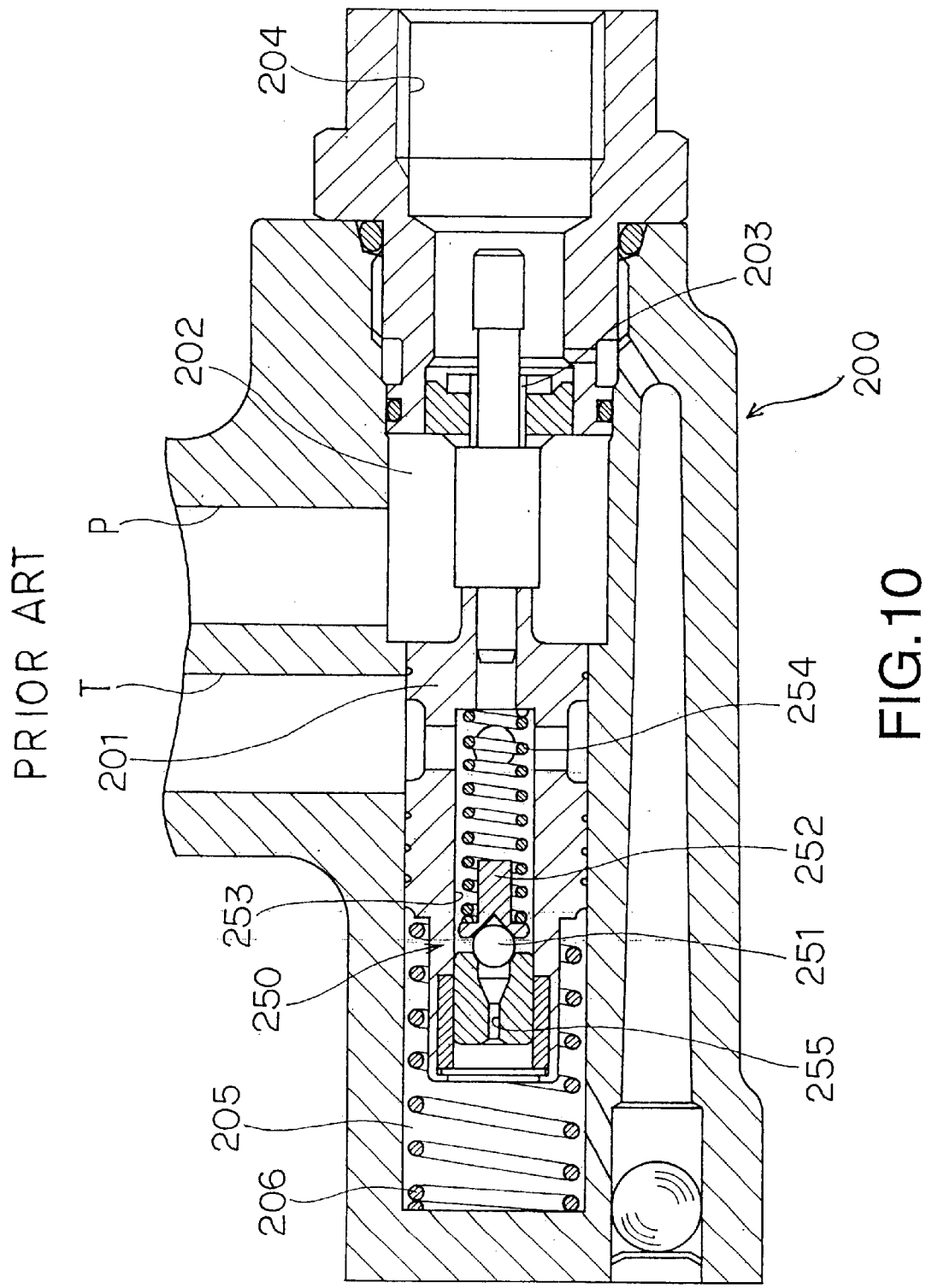
FIG. 10 shows the prior art.

FIG. 9 shows a seventh embodiment.

In the seventh embodiment, the construction of the relief valve 1 is identical to that of the first embodiment, however the opening area of an orifice 118 between the pump port P and an oil supply port 120 which supplies oil to the power steering device is made variable by a solenoid valve 110, unlike the first embodiment.

The spool 40 of the flowrate control valve 20 comprises an end part 46 of small diameter situated at the end of the sliding part 43 which slides in the slide hole 31. The pump port P opens onto the side of this end part 46. The tank port T opens onto the side of the slide part 43, and opens onto the end part 46 when the spool 14 has retracted so that part of the fluid from the pump port P is discharged to the tank port T.

The solenoid valve 110 is disposed between the oil supply port 120 which communicates with the power steering device, and the pump port P. The solenoid valve 110 comprises a fixed iron core 112 which has a coil 111 on the outer circumference, and a rod 114 which has a movable iron core on the outer circumference. The rod 114 is supported free to slide in an axial direction via bearings 115, 116, and is driven by energizing the coil 111. The end part of the rod 114 engages with the opening of a seat 117. The outer circumferential part of this rod 114 and the seat 117 form an orifice 118, the opening area of the orifice 118 being varied by the retraction of the rod 114.

Due to this construction, control of the opening area of the orifice 118 between the pump port P and oil supply port 120 can be performed more precisely.

The aforesaid embodiments may be combined, and any desired combination may be used if it is possible.

The orifice downstream of the seat hole of the relief valve may be provided in another way.

In the above embodiments, the relief valve was applied to a flowrate control valve of a vane pump supplying oil pressure to the power steering device, but the invention is not limited to this arrangement, and may be applied to a relief valve used for any application. The embodiments of this invention in which an exclusive property or privilege is claimed are defined as follows:

What is claimed is:

1. A flowrate control valve which controls the flowrate supplied from a pump to a load circuit comprising a relief valve, the relief valve comprising:

a valve seat having a seat hole;
a ball which opens and closes the seat hole from a downstream side;
a movable member which supports the ball from the downstream side, the movable member having an outer circumferential surface;
a housing part which houses the movable member, the housing part having an inner circumferential surface; and
a vibration damping orifice formed downstream of the seat hole which damps vibration of the movable member and suppresses chattering by restricting an oil flow, wherein:
the movable member slides on the inner circumferential surface of the housing part;
the vibration damping orifice is grooves formed on either one of the outer circumferential surface of the movable member, and the inner circumferential surface of the housing part; and
the relief valve opens when pressure on the load circuit side thereof rises, and part of the fluid from the pump is discharged to a tank port.

2. The flowrate control valve as defined in claim 1, further comprising:

a spool having one side and an other side;
a supply chamber formed on the one side of the spool;
a flowrate control valve chamber formed on the other side of the spool; and
a flowrate control spring provided in the flowrate control spring chamber which pushes the spool in a direction toward the supply chamber, wherein:
a pump pressure is led to the supply chamber,
oil is supplied from the supply chamber to a supply port to the load circuit via a supply orifice,
pressure downstream of the supply orifice is led to the flowrate control valve chamber via at least one throat or further orifice,
the spool being retractable in a direction toward the flowrate control spring chamber so that the supply chamber communicates with the tank port,
the relief valve is built into the spool from the side of the flowrate control spring chamber, and
when the relief valve opens, the flowrate control spring chamber communicates with the tank port.

3. A relief valve comprising:

a valve seat having a seat hole;
a ball which opens and closes the seat hole from a downstream side thereof;
a movable member which supports the ball from a downstream side thereof, the movable number having an outer circumferential surface;
a housing part which houses the movable member, the housing part having an inner circumferential surface; and
an orifice formed downstream of the seat hole, which damps vibration of the movable member and suppresses chattering by restricting an oil flow, wherein:
the movable member always slides on the inner circumferential surface of the housing part when the movable member moves to operate the value; and
the orifice is a plurality of grooves formed on either one of the outer circumferential surface of the movable member, and the inner circumferential surface of the housing part.

* * * * *